Feb. 27, 1951     W. HEINING     2,543,166
SNOW REMOVAL APPARATUS

Filed Sept. 9, 1949     2 Sheets-Sheet 1

Inventor
WILLIAM HEINING

By McMorrow, Berman + Davidson
Attorney

Feb. 27, 1951
W. HEINING
2,543,166
SNOW REMOVAL APPARATUS
Filed Sept. 9, 1949
2 Sheets—Sheet 2
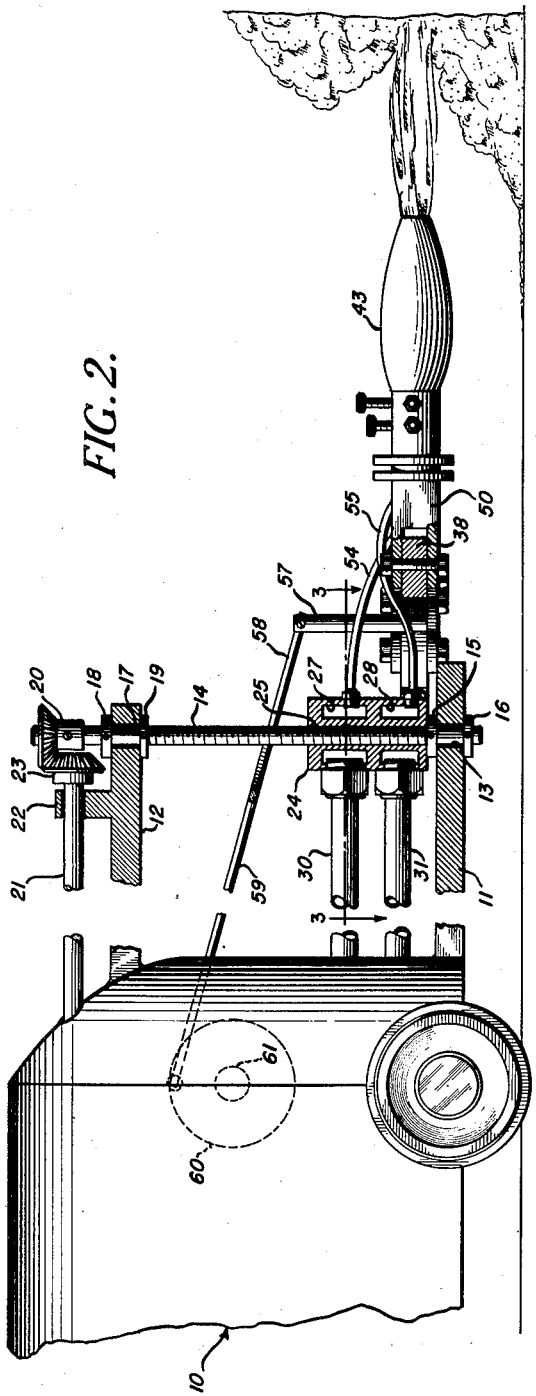
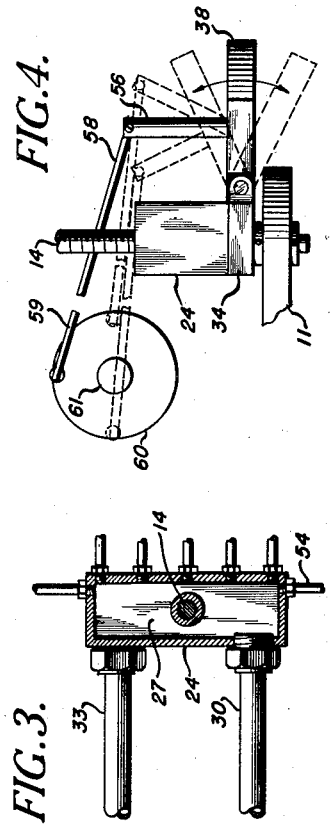
Inventor
WILLIAM HEINING
By McMorrow, Berman & Davidson
Attorney Patented Feb. 27, 1951

2,543,166

UNITED STATES PATENT OFFICE 2,543,166

SNOW REMOVAL APPARATUS

William Heining, Pasadena, Calif.

Application September 9, 1949, Serial No. 114,876

3 Claims. (Cl. 126—271.2)

This invention relates to snow removal apparatus, and more particularly to portable apparatus attachable to a vehicle, such as a locomotive, truck or tractor, surface or submersive boat or sled, and operative to melt snow from a road, railway, street, landing strip or similar path of vehicular travel.

It is among the objects of the invention to provide improved snow removal apparatus which can be readily mounted on an existing vehicle, or provided as a component of a special vehicle, and carried at the front or rear end or at both ends of such vehicle to melt snow before the vehicle, which includes a plurality of flame nozzles disposed in side-by-side, or any other desired relationship and mounted on a carrier which can be moved to raise and lower the nozzles, tilt them upwardly and downwardly and swing them from side-to-side, such tilting and swinging movements being automatic or manually controlled, as desired, which includes means for simultaneously supplying fuel and combustion air to the several nozzles, and which is simple and durable in construction, highly effective in use, and economical to manufacture and install.

Other objects and advantages will become apparent from a consideration of the following description and the appended claims in conjunction with the accompanying drawings, wherein:

Figure 2 is a side elevation of the fragmentary portion of the vehicle illustrated in Figure 1, and a longitudinal cross-section on the line 2—2 of Figure 1 of the snow removal apparatus;

Figure 3 is a cross-sectional view of a fragmentary portion of the apparatus taken substantially on the line 3—3 of Figure 2; and Figure 4 is a side elevation of a fragmentary portion of the snow removal apparatus, showing different operative positions of the fragmentary portion of the apparatus in full and broken lines.

Figure 1:
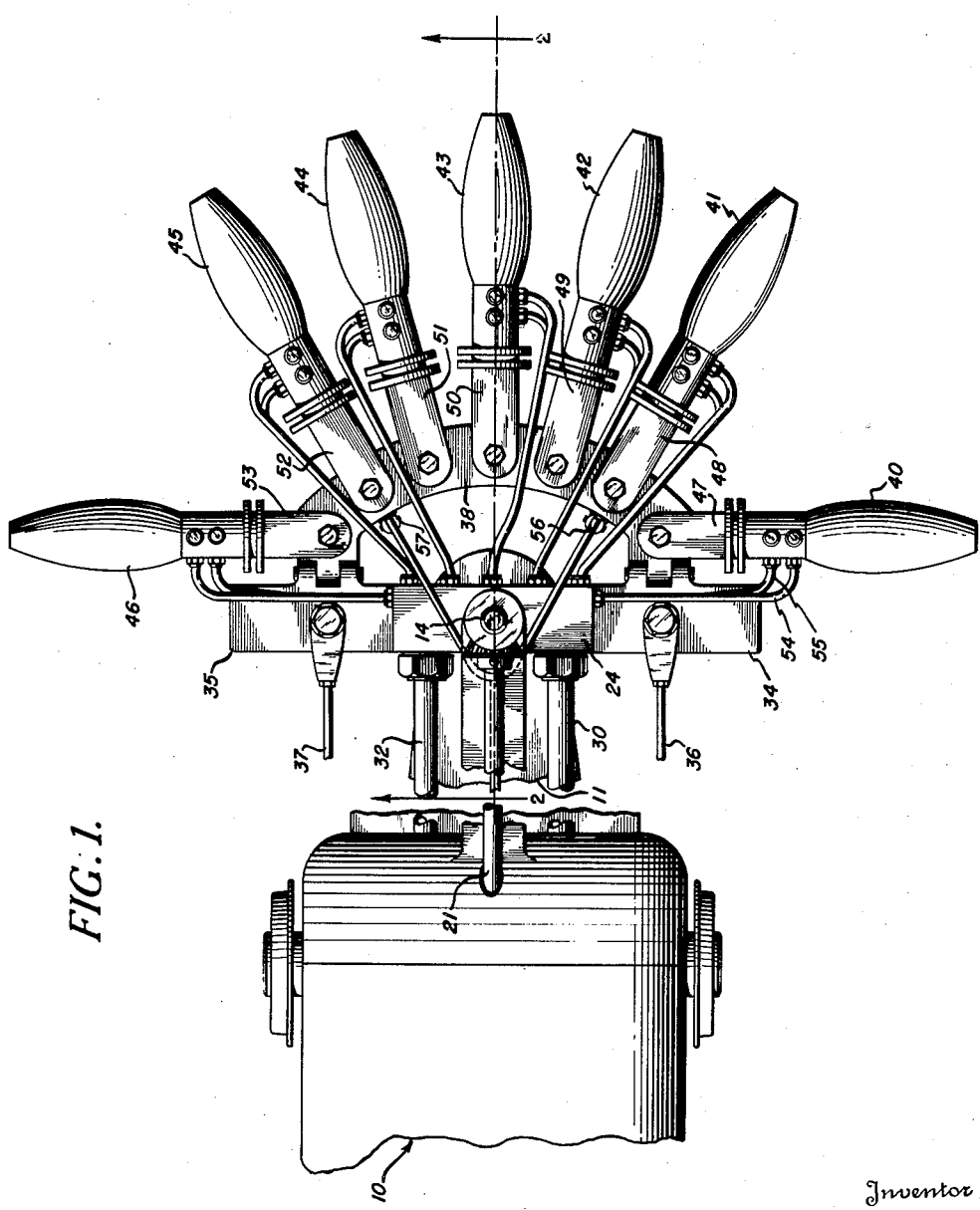
Figure 1 is a top plan view of a fragmentary portion of a vehicle, such as a railway locomotive, with a snow removal apparatus, illustrative of the invention, operatively positioned in front of the vehicle, the vehicle and the apparatus being illustrated on respectively different scales.

With continued reference to the drawings, the vehicle, generally indicated at 10, may be any suitable conventional vehicle, or a special vehicle, the vehicle diagrammatically illustrated being a Diesel or electric-driven type of railway locomotive. A support 11 is attached to the vehicle and projects forwardly of the front end thereof at the bottom of the vehicle body and a brace 12 projects forwardly from the front end of the vehicle body above the support 11 and near the top of the body.

Near its front end, remote from the vehicle body, the support 11 is provided with a vertical aperture 13 and a screw shaft 14 is journaled at its lower end in this aperture, being held against longitudinal movement by spaced-apart collars 15 and 16 secured on the shaft at the upper and lower sides of the support, respectively. The brace 12 is provided near its front end, remote from the vehicle body, with a vertical aperture 17 in which the screw shaft 14 is journaled near the upper end of the latter, collars 18 and 19 being secured on the screw shaft at the respectively upper and lower sides of the brace. A beveled gear 20 is secured on the screw shaft 14 near the upper end of the latter and above the brace 12, and a shaft 21 projects forwardly from the vehicle body and is journaled near its forward end in a bearing box 22 carried by the brace 12. A beveled gear 23 is secured on the shaft 21 at its forward end and meshes with the beveled gear 20 to rotate the screw shaft 14 when the shaft 21 is rotated.

Suitable power or manually-operated means is provided in the body of the vehicle 10 for rotating the shaft 21 and the screw shaft 14, when desired.

An elongated manifold housing 24 is provided with a substantially centrally-disposed, screw-threaded bore 25 through which the screw shaft 14 is threaded, so that the housing will be raised or lowered as the screw shaft is rotated in one or the other direction.

This housing 24 includes two separate chambers, as indicated at 27 and 28, one of which is a fuel chamber, and the other of which is a combustion air chamber.

Four flexible tubes, 30, 31, 32 and 33 extend forwardly from the front end of the vehicle body to the manifold housing 24. The upper two tubes 30 and 32 are connected to the upper chamber 27 in the manifold housing, while the two lower tubes 31 and 33 are connected to the lower chamber 28. The flexible tubes connected to one of the chambers in the manifold housing are connected at their rear ends, within the vehicle body, to a suitable fuel supply tank or pump, while the other two of the flexible tubes are connected to a suitable air compressor, the fuel supply means and the air compressor being not illustrated as they may be of entirely conventional construc- The housing 24 has at its lower side two lateral extensions 34 and 35 which project outwardly from respectively-opposite ends of the housing. A tension link or cable 36 extends from the front end of the vehicle body and is pivotally connected to the extension 34, and a complementary tension link or cable 37 extends from the front end of the vehicle body and is pivotally connected at its forward end to the extension 35. The links 36 and 37 are connected in the vehicle body to a suitable power or manually-operated means, not illustrated, for alternatively pulling on one of the links and loosening the other to swing the housing 24 with its extensions 34 and 35 about the screw shaft 14.

An arcuately-curved carrier 38 is positioned at the forward side of the manifold housing 24, and is pivotally connected at its opposite ends to the forward sides of the extensions 34 and 35, respectively, for tilting movements up and down relative to the housing 24, and the support 11.

A plurality of flame nozzles, as indicated at 40 to 46 inclusive, are supported on the carrier by respective bifurcated yokes 47 to 53 inclusive, so that the two end nozzles 40 and 46 extend laterally outward from the carrier, the center nozzle 43 is directed straight ahead of the carrier, the nozzles 41 and 42 are angularly disposed between the nozzles 40 and 43, and the nozzles 44 and 45 are angularly disposed between the nozzles 46 and 43. The connections between the yokes and the carrier are adjustable, so that the several nozzles may be positioned for the most effective operation.

A conduit 54 leads from the upper chamber 27, in the manifold housing, to the nozzle 40, and a similar, lower conduit 55 leads from the lower manifold housing chamber 28 to the nozzle 40. Similar upper and lower conduits lead from the two chambers, in the manifold housing, to each of the remaining flame nozzles to supply fuel and combustion air to the nozzles, so that the several nozzles will project individual flames in advance of the vehicle, as illustrated in Figure 2.

Two posts 56 and 57 are secured to the inner side of the carrier 38 near respectively-opposite ends of the carrier, and project upwardly therefrom. A bridle 58 is secured at its opposite ends to the posts 56 and 57, respectively, at the upper ends of the latter, and a rod 59 is connected at its forward end to the bridle 58 at the mid-length location of the latter and extends rearwardly into the body of the vehicle 10. At its rearward end the rod 59 is connected to a crank or disc 60, near the outer circumference of the disc. This disc is mounted on a rotatable shaft 61 and upon rotation, is effective to tiltingly move the carrier 38 up and down, as is clearly illustrated in Figure 4.

The shaft 61 may be either power operated or may be rotated manually, as may be found convenient or desirable.

When the screw shaft 14 is rotated, the housing 24 will be raised or lowered, as explained above, raising or lowering the carrier 38 and the flame nozzles carried thereby. The tension links 36 and 37 may be operated to swing the carrier and the flame nozzles from side-to-side at any position of elevation of the housing 24 along the screw shaft 14, and the bridle 58 and link 59 may be operated to tilt the carrier and the flame nozzles up and down, also at any elevation of the housing 24 on the screw shaft 14, and regardless of whether or not the links 36 and 37 are operating to swing the carrier and nozzles from side-to-side at the same time.

Preferably suitable guards, not illustrated, are secured to the support 11 and extend in front of the nozzles to protect the nozzles from damage by contact with obstructions, such as posts, trees and stones, and a housing or cover, also not illustrated, extends over the nozzles and the mounting means therefor to protect the nozzles and the mounting means from damage by snow and ice and other obstacles. If desired, suitable air suction means may be provided to draw the steam and vapor from the melting snow rearwardly through such a cover or housing, and discharge it laterally near the ground, so that it will not freeze onto the vehicle or the snow removal apparatus and interfere with the operation of the vehicle and the apparatus.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. Snow removing apparatus comprising a support attachable to a vehicle to project from an end thereof, a manifold housing carried on said support, a carrier, a plurality of flame nozzles mounted on said carrier, means supporting said carrier on said support for raising and lowering movements, up-and-down tilting movements, and side-to-side swinging movements of said carrier and nozzles relative to said support, conduits connecting each nozzle individually with said manifold housing, means connecting said manifold housing with a source of fuel and a source of combustion air, means carried on said support and adapted to be connected between said carrier and said vehicle for raising and lowering said carrier, and means connected with said carrier and adapted to be connected to an apparatus supporting vehicle for tilting said carrier and for swinging the latter from side-to-side.

2. Snow removal apparatus comprising a support attachable to a vehicle to project therefrom, a rotatable screw shaft journaled at its lower end in said support and projecting upwardly therefrom, a manifold housing threaded onto said screw shaft and movable up-and-down relative to said support upon rotation of said screw shaft in respectively opposite directions, a carrier disposed ahead of said housing and pivotally connected to the latter for tilting movements about an axis substantially at right angles to the axis of rotation of said screw shaft, means connected to said carrier and extending rearwardly therefrom for tilting said carrier relative to said housing, means connected to said housing and extending rearwardly therefrom for swinging said housing and said carrier about the axis of said screw shaft, a plurality of flame nozzles carried by said carrier, conduit means individually connecting said nozzles to said manifold housing, and conduit means extending from said manifold housing for connecting the latter to a fuel supply means and a combustion air supply means.

3. Snow removal apparatus comprising a support attachable to a vehicle to project therefrom, a rotatable screw shaft journaled at its lower end in said support and projecting upwardly therefrom, a manifold housing threaded onto said screw shaft and movable up-and-down relative to said support upon rotation of said screw shaft in respectively opposite directions, a carrier disposed ahead of said housing and pivotally connected to the latter for tilting movements about an axis substantially at right angles to the axis of rotation of said screw shaft, means connected to said carrier and extending rearwardly therefrom for tilting said carrier relative to said housing, means connected to said housing and extending rearwardly therefrom for swinging said housing and said carrier about the axis of said screw shaft, a plurality of flame nozzles carried by said carrier, conduit means individually connecting said nozzles to said manifold housing, and conduit means extending from said manifold housing for connecting the latter to a fuel supply means and a combustion air supply means, said means connected to said carrier for tilting the same comprising two spaced-apart posts secured to said carrier and projecting upwardly therefrom, a bridle connected respectively at its opposite ends to said posts at the upper ends of the latter, a rod connected at one end to said bridle at the mid-length location thereof, and a rotatable shaft eccentrically connected to the other end of said rod.

WILLIAM HEINING.

REFERENCES CITED

The following references are of record in the file of this patent:

UNITED STATES PATENTS

| Number | Name | Date |
|---|---|---|
| 1,390,639 | Porter | Sept. 13, 1921 |
| 1,453,552 | Fuller et al. | May 1, 1923 |
| 1,759,859 | La Court | May 27, 1930 |

FOREIGN PATENTS

| Number | Country | Date |
|---|---|---|
| 429,940 | Germany | June 8, 1926 |